United States Patent [19]

Nishino et al.

[11] Patent Number: 4,594,231

[45] Date of Patent: Jun. 10, 1986

[54] METHOD FOR REMOVAL OF POISONOUS GASES

[75] Inventors: Hiroshi Nishino, Suita; Toshio Aibe, Kashima, both of Japan

[73] Assignee: Takeda Chemical Industries, Ltd., Osaka, Japan

[21] Appl. No.: 653,091

[22] Filed: Sep. 21, 1984

[30] Foreign Application Priority Data

Sep. 22, 1983 [JP] Japan .................................. 58-176092
Aug. 30, 1984 [JP] Japan .................................. 59-181897

[51] Int. Cl.⁴ .............................................. C01B 7/00
[52] U.S. Cl. .................................... 423/210; 423/240; 423/241; 55/71; 55/72; 502/416; 502/417
[58] Field of Search ............... 423/210 S, 240 S, 241; 55/71, 72; 502/416, 417

[56] References Cited

U.S. PATENT DOCUMENTS 1,519,470 12/1924 Wilson et al. .................. 423/210 S

FOREIGN PATENT DOCUMENTS 2114911 9/1983 United Kingdom ............ 423/210 S

*Primary Examiner*—Andrew H. Metz
*Assistant Examiner*—Robert L. Stoll
*Attorney, Agent, or Firm*—Wenderoth, Lind & Ponack

[57] ABSTRACT

Halogens and/or hydrogen halides in a gas can easily be removed from the gas by contacting the gas with an adsorbent comprising an activated carbon having as supported thereon (1) one or more components included in one of the three groups shown below and (2) one or more components included in the remaining two groups shown below:

| Group | Component |
|-------|-----------|
| I | copper compound |
| II | zinc compound |
| III | (a) alkali metal compounds |
|   | (b) alkaline earth metal compounds |
|   | (c) compounds of Al, Ti, V, Cr, Mn, Fe, Co, Ni, Cd and Pb |

10 Claims, No Drawings

METHOD FOR REMOVAL OF POISONOUS GASES

This invention relates to a method of removing halogens and/or hydrogen halides from gases containing the same.

Halogens and hydrogen halides are contained in process gases from petrochemical and chemical plants, by-product gases from iron works, electrolytic hydrogen, steam for reforming and other various waste gases. Such halogens and hydrogen halides, which, even in trace amounts, are extremely poisonous to the human body, exert corrosive action on metal surfaces of equipment, etc. and also exhibit catalyst poison action, often present problems in such processes as chemical reaction.

As the method of removing halogens and hydrogen halides in gases, there have been proposed, for example, a procedure of washing with chemical solutions such as alkaline solutions, and an adsorption process with use of activated carbon, etc. However, these methods show inferior removal effect, and a more efficient adsorbent has been demanded.

The present inventors, in view of these circumstances, conducted intensive investigation, and as a result, found that by having as supported on activated carbon two or more specific components selected from (I) copper compounds, (II) zinc compounds and (III) (a) alkali metal compounds, (b) alkaline earth metal compounds and (c) compounds of Al, Ti, V, Cr, Mn, Fe, Co, Ni, Cd and Pb, halogens and hydrogen halides in gases can be removed with enhanced efficiency, which has culminated in the present invention.

Thus the present invention relates to:

1. A method for the removal of halogens and/or hydrogen halides from a gas containing the same, which comprises contacting the gas with an adsorbent comprising an activated carbon having as supported thereon (1) one or more components included in one of the three groups shown below and (2) one or more components included in the remaining two groups shown below:

| Group | Component |
| --- | --- |
| I | copper compounds |
| II | zinc compounds |
| III | (a) alkali metal compounds |
| | (b) alkaline earth metal compounds |
| | (c) compounds of Al, Ti, V, Cr, Mn, Fe, Co, Ni, Cd and Pb |

A copper compound in Group I is hereinafter referred to as Component I; a zinc compound in Group II is hereinafter referred to as Component II; a compound in Group III is hereinafter referred to as Component III; an alkali metal compound in Group III is hereinafter referred to as Component III-a; an alkaline earth metal compound in Group III is hereinafter referred to as Component III-b; and a compound of Al, Ti, V, Cr, Mn, Fe, Co, Ni, Cd or Pb is hereinafter referred to as Component III-c.

The adsorbent used in the present invention can be prepared by supporting on the activated carbon two or more of Component I, Component II and Component III.

The activated carbon which is useful in this case may be any type of activated carbon produced by the known processes from coal, coke, wood charcoal, coconut shells, resins, etc., while its specific surface area is preferably within the range from 200 to 2000 $m^2/g$. With reference to its shape and form, use is suitably made for example of spherical- and cylindrical-formed, crushed, powdered and fibrous-formed activated carbon according to the type of gas treatment methods.

Examples of the copper compound which is used as the Component I in the present invention include inorganic acid salts or inorganic compounds such as carbonates, basic carbonates, nitrates, sulfates, phosphates, halides, oxides and hydroxides; and organic acid salts such as formates, acetates and oxalates.

Examples of the zinc compound which is used as the Component II in the present invention include inorganic acid salts or inorganic compounds such as carbonates, basic carbonates, nitrates, sulfates, phosphates, silicates, halides, oxides and hydroxides; and organic acid salts such as formates, acetates and oxalates.

As the alkali metal compound which is one of the Component III, there may be mentioned inorganic compounds of Li, Na, K, Rb and Cs such as hydrogencarbonates, carbonates, nitrates, borates, silicates, sulfates, halides and hydroxides, organic acid salts thereof such as formates, acetates, oxalates, benzoates, salts with phenols and sulfonates, and so forth.

As the alkaline earth metal compound which is another Component III, there may be mentioned inorganic acid salts or inorganic compounds of Be, Mg, Ca, Sr and Ba such as carbonates, nitrates, sulfates, phosphates, halides, oxides and hydroxides, organic acid salts thereof such as formates, acetates and oxalates, and the like.

Examples of the compounds of Al, Ti, V, Cr, Mn, Fe, Co, Ni, Cd and Pb which are another Component III include inorganic acid salts or inorganic compounds of these metals such as carbonates, hydrogencarbonates, nitrates, borates, silicates, sulfates, phosphates, halides, hydroxides, ammonium salts and oxides, and organic acid salts thereof such as formates, acetates, oxalates, benzoates, salts with phenols and salts with sulfonic acids.

The adsorbent of the present invention comprises activated carbon having two or more of the Components I, II and III contained therein. More specifically, as Component III, Component III-a, Component III-b and Component III-c may be contained solely, respectively, and out of these, two kinds of such components, for example the Components III-a and III-b, the Components III-b and III-c and the Components III-c and III-a, may be contained, though the Components III-a, III-b and III-c, may be contained simultaneously. In addition, not less than two types of different components within the components of the same kind may be contained; thus, for example, not less than two kinds of compounds may be contained as the Component I, not less than two kinds of compounds may be contained as the Component II, and not less than two kinds of different compounds within the Component III-a may be contained as the Component III.

The content of Component I in activated carbon containing the metal compounds is 0.1 mg-atom to 3.0 mg-atom as metal per g of activated carbon, preferably 0.2 mg-atom to 2.0 mg-atom. The content of Component II is 0.1 mg-atom to 3.0 mg-atom as metal per g of activated carbon, preferably 0.2 mg-atom to 2.0 mg-atom. The content of Component III is 0.1 mg-atom to 5.0 mg-atom as metal per g of activated carbon, preferably 0.2 mg-atom to 4.0 mg-atom.

The adsorbent used in the present invention may comprise activated carbon having each of the components as supported or deposited thereon, and may be those obtained by adding each component to a raw material for activated carbon and then activating it. The adsorbent may also be those obtainable by adding a part of each of Components I, II and III to a raw material for activated carbon and activating it, followed by deposition of the remainder of each of the components. In cases in which each of the Components is deposited on activated carbon, it is desirable to conduct drying or calcining after deposition.

As the procedure of depositing each of the components on activated carbon, a process of impregnating or spraying activated carbon with a solution or suspension of individual components in water (inclusive of aqueous acid or alkali solution) or various solvents may be conceivable. In the preparation process described hereinbefore, the term "drying" denotes a step in which the water or solvent in the activated carbon having the components deposited is evaporated at a temperature of not higher than about 130° C., while the term "calcining" means a step in which the activated carbon having the components deposited after being dried at a temperature of not lower than about 130° C. is heated in an atmosphere of inert gas, carbonic acid gas, steam, combustion waste gas, etc. to decompose thermally part or all of the metal compounds.

In the above-mentioned process, when compounds other than oxides are deposited on activated carbon as Component I, Component II and Component III (exclusive of the alkali metal compounds), it is desirable to conduct heat treatment such as drying or calcining after deposition, and in cases in which Component I, Component II and Component III (exclusive of the alkali metal compounds) are deposited on activated carbon without heat treatment, it is recommended to use oxides as Component I, Component II and Component III (exclusive of the alkali metal compounds). In cases where alkali metal compounds other than hydroxides, carbonates and hydrogencarbonates of alkali metals are deposited on activated carbon as Component III, it is preferred to conduct heat treatment such as drying or calcining after deposition, and when the alkali metal compounds are deposited without subsequent heat treatment, it is desirable to employ hydroxides, carbonates and hydrogencarbonates as the alkali metal compounds.

In the present invention, the term "halogens" represents $F_2$, $Cl_2$, $Br_2$ and $I_2$, and the term "hydrogen halides" denotes HF, HCl, HBr and HI.

In the present invention, a gas containing halogens and hydrogen halides may be contacted with the adsorbent.

As the technique of contacting, use is made for example of the known means such as fixed bed, moving bed and fluidized bed. In such cases, the contact temperature is not higher than 600° C., preferably 0° to 300° C., and the pressure is not more than 300 kg/cm$^2$, preferably 0.1 to 250 kg/cm$^2$. The contact time is 1/10 to 100 seconds as converted at 25° C. and 1 kg/cm$^2$, preferably 1/5 to 80 seconds.

The examples are described below to illustrate the present invention more specifically.

EXAMPLE 1

Activated carbon $A_0$ of 16 to 24 mesh having a BET specific surface area of 1150 m$^2$/g was sprayed uniformly with solutions in water of the desired amount of each of the Component I (copper nitrate) and Component II (zinc nitrate) and/or Component III (nitrates of alkali metals, nitrates of alkaline earth metals and nitrates of Al, Ti, V, Cr, Mn, Fe, Co, Ni, Cd and Pb (sulfate only for V)).

50 ml each of the resulting deposited products were packed into columns of 4 cm in diameter made of quartz glass, and the columns were heated at a heating rate of 5° C./min, while passing a nitrogen gas through each of them at a linear flow rate of 10 cm/sec, to conduct calcining at 300° C. for 30 minutes.

The content of each of the metal compounds in the resulting adsorbents were 0.2 to 2.0 mg-atom as individual metal per g of activated carbon, as shown in Table 1.

As the control references, activated carbon $A_0$ was deposited with a nitrate of each of the metals alone, and calcined in nitrogen gas at 300° C. for 30 minutes to prepare adsorbents.

15 ml each of the adsorbents thus obtained were packed into columns of 1.6 cm in diameter made of glass, and a gas (97.5 vol.% of $N_2$ and 2.5 vol.% of $H_2O$) containing 20 ppm of HCl and 10 ppm of $Cl_2$ was passed through the individual columns at a linear flow rate of 40 cm/sec (as converted at 30° C.) at 200° C. to check the changes of removal ratio for HCl—$Cl_2$ (as converted to the total Cl) in relation to time. The results are shown in Table 1.

EXAMPLE 2

Packed into columns of 1.6 cm in diameter made of glass were 15 ml each of the adsorbents $A_0$, $A_1$, $A_3$, $A_9$, $A_{12}$, $B_2$, $B_3$, $C_4$, $C_6$, $C_9$, $D_2$, $D_3$, $D_8$, $D_{10}$, $D_{12}$, $D_{13}$, $D_{14}$, $D_{15}$, $E_2$, $E_3$, $E_4$, $F_1$, $F_6$, $F_9$, $G_1$, $G_2$, $G_3$, $G_6$, $G_8$ and $G_{10}$ shown in Table 1 and a gas (8 vol.% of $H_2$ and 92 vol.% of $N_2$) of 30° C. containing 20 ppm of HCl and 10 ppm of $Cl_2$ was passed through the individual columns at a linear flow rate of 40 cm/sec to check the changes of removal ratio for HCl—$Cl_2$ (as converted to the total Cl) in relation to time. The results are shown in Table 2.

TABLE 1

| Adsorbent No. | Components supported on activated carbon and their amount (mg-atom/g) | | | Percent removal of HCl and Cl$_2$ at the elapsed time shown below (%) | | | |
|---|---|---|---|---|---|---|---|
| | Component I | Component II | Component III | 5 hrs. | 10 hrs. | 20 hrs. | 50 hrs. |
| $A_0$ (Control) | — | — | — | 15 | 2 | 0 | 0 |
| $A_1$ (Control) | Cu-2.0 | — | — | 100 | 100 | 65 | 0 |
| $A_2$ (Control) | — | — | Na-2.0 | 100 | 98 | 5 | 0 |
| $A_3$ (Control) | — | — | K-2.0 | 100 | 100 | 17 | 0 |
| $A_4$ (Control) | — | — | Mg-2.0 | 100 | 90 | 3 | 0 |
| $A_5$ (Control) | — | — | Ca-2.0 | 100 | 85 | 3 | 0 |

TABLE 1-continued

| Adsorbent No. | Components supported on activated carbon and their amount (mg-atom/g) | | | Percent removal of HCl and Cl$_2$ at the elapsed time shown below (%) | | | |
|---|---|---|---|---|---|---|---|
| | Component I | Component II | Component III | 5 hrs. | 10 hrs. | 20 hrs. | 50 hrs. |
| A$_6$ (Control) | — | — | Sr-2.0 | 100 | 79 | 5 | 0 |
| A$_7$ (Control) | — | — | Al-2.0 | 100 | 85 | 5 | 0 |
| A$_8$ (Control) | — | — | Cr-2.0 | 100 | 92 | 15 | 0 |
| A$_9$ (Control) | — | — | Fe-2.0 | 100 | 100 | 30 | 0 |
| A$_{10}$ (Control) | — | — | Ni-2.0 | 100 | 100 | 52 | 0 |
| A$_{11}$ (Control) | — | — | Pb-2.0 | 100 | 95 | 10 | 0 |
| A$_{12}$ (Control) | — | Zn-2.0 | — | 100 | 100 | 75 | 0 |
| B$_1$ (The present invention) | Cu-1.0 | — | Na-1.0 | 100 | 100 | 100 | 18 |
| B$_2$ (The present invention) | Cu-1.0 | — | K-1.0 | 100 | 100 | 100 | 26 |
| B$_3$ (The present invention) | Cu-1.0 | — | Mg-1.0 | 100 | 100 | 100 | 5 |
| B$_4$ (The present invention) | Cu-1.0 | — | Ca-1.0 | 100 | 100 | 100 | 10 |
| B$_5$ (The present invention) | Cu-1.0 | — | Sr-1.0 | 100 | 100 | 100 | 13 |
| C$_1$ (The present invention) | Cu-1.0 | — | Al-1.0 | 100 | 100 | 100 | 32 |
| C$_2$ (The present invention) | Cu-1.0 | — | Ti-1.0 | 100 | 100 | 100 | 40 |
| C$_3$ (The present invention) | Cu-1.0 | — | V-1.0 | 100 | 100 | 100 | 18 |
| C$_4$ (The present invention) | Cu-1.0 | — | Cr-1.0 | 100 | 100 | 100 | 85 |
| C$_5$ (The present invention) | Cu-1.0 | — | Mn-1.0 | 100 | 100 | 100 | 69 |
| C$_6$ (The present invention) | Cu-1.0 | — | Fe-1.0 | 100 | 100 | 100 | 80 |
| C$_7$ (The present invention) | Cu-1.0 | — | Co-1.0 | 100 | 100 | 100 | 75 |
| C$_8$ (The present invention) | Cu-1.0 | — | Ni-1.0 | 100 | 100 | 100 | 75 |
| C$_9$ (The present invention) | Cu-1.0 | Zn-1.0 | — | 100 | 100 | 100 | 88 |
| C$_{10}$ (The present invention) | Cu-1.0 | — | Cd-1.0 | 100 | 100 | 100 | 15 |
| C$_{11}$ (The present invention) | Cu-1.0 | — | Pb-1.0 | 100 | 100 | 100 | 23 |
| C$_{12}$ (The present invention) | Cu-0.2 | — | Cr-1.0 | 100 | 100 | 85 | 3 |
| C$_{13}$ (The present invention) | Cu-0.5 | — | Cr-1.0 | 100 | 100 | 95 | 4 |
| C$_{14}$ (The present invention) | Cu-2.0 | — | Cr-1.0 | 100 | 100 | 100 | 93 |
| D$_1$ (The present invention) | Cu-1.0 | — | Na-0.3, Al-0.5 | 100 | 100 | 100 | 86 |
| D$_2$ (The present invention) | Cu-1.0 | — | K-0.3, V-0.5 | 100 | 100 | 100 | 90 |
| D$_3$ (The present invention) | Cu-1.0 | — | K-0.3, Cr-0.5 | 100 | 100 | 100 | 100 |
| D$_4$ (The present invention) | Cu-1.0 | — | K-0.3, Mn-0.5 | 100 | 100 | 100 | 99 |
| D$_5$ (The present invention) | Cu-1.0 | — | K-0.3, Fe-0.5 | 100 | 100 | 100 | 100 |
| D$_6$ (The present invention) | Cu-1.0 | — | Mg-0.3, Co-0.5 | 100 | 100 | 100 | 98 |
| D$_7$ (The present invention) | Cu-1.0 | — | Ca-0.3, Ni-0.5 | 100 | 100 | 100 | 100 |
| D$_8$ (The present invention) | Cu-1.0 | Zn-0.5 | K-0.3 | 100 | 100 | 100 | 100 |
| D$_9$ (The present invention) | Cu-1.0 | — | Na-0.3, Cd-0.5 | 100 | 100 | 100 | 100 |
| D$_{10}$ (The present invention) | Cu-1.0 | — | K-0.3, Pb-0.5 | 100 | 100 | 100 | 85 |
| D$_{11}$ (The present invention) | Cu-0.2 | — | K-0.3, Cr-0.5 | 100 | 100 | 100 | 46 |
| D$_{12}$ (The present invention) | Cu-0.5 | — | K-0.3, Mn-0.5 | 100 | 100 | 100 | 58 |
| D$_{13}$ (The present invention) | Cu-0.2 | — | Mg-0.5, Cr-0.5 | 100 | 100 | 100 | 48 |
| D$_{14}$ (The present invention) | Cu-0.5 | — | Mg-0.5, Cr-0.5 | 100 | 100 | 100 | 100 |
| D$_{15}$ (The present invention) | Cu-1.0 | — | K-0.3, Mg-0.3, Cr-0.5, Fe-0.25 | 100 | 100 | 100 | 100 |

TABLE 1-continued

| Adsorbent No. | Component I | Component II | Component III | 5 hrs. | 10 hrs. | 20 hrs. | 50 hrs. |
|---|---|---|---|---|---|---|---|
| $E_1$ (The present invention) | — | Zn-1.0 | Na-1.0 | 100 | 100 | 100 | 20 |
| $E_2$ (The present invention) | — | Zn-1.0 | K-1.0 | 100 | 100 | 100 | 30 |
| $E_3$ (The present invention) | — | Zn-1.0 | Mg-1.0 | 100 | 100 | 100 | 35 |
| $E_4$ (The present invention) | — | Zn-1.0 | Ca-1.0 | 100 | 100 | 100 | 100 |
| $E_5$ (The present invention) | — | Zn-1.0 | Sr-1.0 | 100 | 100 | 100 | 25 |
| $F_1$ (The present invention) | — | Zn-1.0 | Al-1.0 | 100 | 100 | 100 | 30 |
| $F_2$ (The present invention) | — | Zn-1.0 | Ti-1.0 | 100 | 100 | 100 | 25 |
| $F_3$ (The present invention) | — | Zn-1.0 | V-1.0 | 100 | 100 | 100 | 20 |
| $F_4$ (The present invention) | — | Zn-1.0 | Cr-1.0 | 100 | 100 | 100 | 95 |
| $F_5$ (The present invention) | — | Zn-1.0 | Mn-1.0 | 100 | 100 | 100 | 63 |
| $F_6$ (The present invention) | — | Zn-1.0 | Fe-1.0 | 100 | 100 | 100 | 75 |
| $F_7$ (The present invention) | — | Zn-1.0 | Co-1.0 | 100 | 100 | 100 | 65 |
| $F_8$ (The present invention) | — | Zn-1.0 | Ni-1.0 | 100 | 100 | 100 | 80 |
| $F_9$ (The present invention) | — | Zn-1.0 | Cd-1.0 | 100 | 100 | 100 | 55 |
| $F_{10}$ (The present invention) | — | Zn-1.0 | Pb-1.0 | 100 | 100 | 100 | 33 |
| $G_1$ (The present invention) | — | Zn-1.0 | Na-0.5, Mg-0.5 | 100 | 100 | 100 | 70 |
| $G_2$ (The present invention) | — | Zn-1.0 | K-0.5, Ca-0.5 | 100 | 100 | 100 | 100 |
| $G_3$ (The present invention) | — | Zn-1.0 | K-0.5, Cr-0.5 | 100 | 100 | 100 | 100 |
| $G_4$ (The present invention) | — | Zn-1.0 | K-0.3, Fe-0.5 | 100 | 100 | 100 | 85 |
| $G_5$ (The present invention) | — | Zn-1.0 | K-0.3, Ni-0.5 | 100 | 100 | 100 | 100 |
| $G_6$ (The present invention) | — | Zn-1.0 | Mg-0.5, Co-0.5 | 100 | 100 | 100 | 96 |
| $G_7$ (The present invention) | — | Zn-1.0 | Mg-0.5, V-0.5 | 100 | 100 | 100 | 90 |
| $G_8$ (The present invention) | — | Zn-1.0 | Ca-0.5, Cr-0.5 | 100 | 100 | 100 | 100 |
| $G_9$ (The present invention) | — | Zn-1.0 | K-0.5, Mg-0.5, Fe-0.5 | 100 | 100 | 100 | 100 |
| $G_{10}$ (The present invention) | — | Zn-1.0 | Mg-0.5, Cr-0.5 | 100 | 100 | 100 | 100 |
| $G_{11}$ (The present invention) | — | Zn-0.2 | K-0.3, Pb-0.5 | 100 | 100 | 100 | 45 |

TABLE 2

| Adsorbent No. | | 10 hrs. | 20 hrs. | 40 hrs. | 60 hrs. |
|---|---|---|---|---|---|
| $A_0$ | (Control) | 85 | 40 | 12 | 2 |
| $A_1$ | (Control) | 100 | 100 | 85 | 12 |
| $A_3$ | (Control) | 100 | 100 | 62 | 8 |
| $A_9$ | (Control) | 100 | 100 | 50 | 5 |
| $A_{12}$ | (Control) | 100 | 100 | 85 | 0 |
| $B_2$ | (The present invention) | 100 | 100 | 100 | 65 |
| $B_3$ | (The present invention) | 100 | 100 | 100 | 40 |
| $C_4$ | (The present invention) | 100 | 100 | 100 | 88 |
| $C_6$ | (The present invention) | 100 | 100 | 100 | 35 |
| $C_9$ | (The present invention) | 100 | 100 | 100 | 59 |
| $D_2$ | (The present invention) | 100 | 100 | 100 | 100 |
| $D_3$ | (The present invention) | 100 | 100 | 100 | 100 |
| $D_8$ | (The present invention) | 100 | 100 | 100 | 100 |
| $D_{10}$ | (The present invention) | 100 | 100 | 100 | 93 |
| $D_{12}$ | (The present invention) | 100 | 100 | 100 | 58 |
| $D_{13}$ | (The present invention) | 100 | 100 | 98 | 30 |
| $D_{14}$ | (The present invention) | 100 | 100 | 100 | 100 |
| $D_{15}$ | (The present invention) | 100 | 100 | 100 | 100 |
| $E_2$ | (The present invention) | 100 | 100 | 100 | 70 |

TABLE 2-continued

| Adsorbent No. | | Percent removal of HCl and Cl₂ at the elapsed time shown below (%) | | | |
|---|---|---|---|---|---|
| | | 10 hrs. | 20 hrs. | 40 hrs. | 60 hrs. |
| E₃ | (The present invention) | 100 | 100 | 100 | 90 |
| E₄ | (The present invention) | 100 | 100 | 100 | 100 |
| F₁ | (The present invention) | 100 | 100 | 100 | 65 |
| F₆ | (The present invention) | 100 | 100 | 100 | 100 |
| F₉ | (The present invention) | 100 | 100 | 100 | 95 |
| G₁ | (The present invention) | 100 | 100 | 100 | 100 |
| G₂ | (The present invention) | 100 | 100 | 100 | 100 |
| G₃ | (The present invention) | 100 | 100 | 100 | 100 |
| G₆ | (The present invention) | 100 | 100 | 100 | 100 |
| G₈ | (The present invention) | 100 | 100 | 100 | 100 |
| G₉ | (The present invention) | 100 | 100 | 100 | 100 |

EXAMPLE 3

Packed into columns of 1.6 cm in diameter made of glass were 15 ml of each of the adsorbents of Example 1, $A_0$, $A_1$, $A_3$, $A_{12}$, $B_2$, $C_4$, $C_9$, $D_3$, $D_8$, $D_{13}$, $D_{15}$, $E_2$, $E_4$, $F_6$, $G_1$, $G_3$ and $G_{10}$, and a gas (97.5 vol. % of $N_2$ and 2.5 vol.% of $H_2O$) containing 20 ppm of HCl and 10 ppm of $Cl_2$, a gas (97.5 vol.% of $N_2$ and 2.5 vol.% of $H_2O$) containing 20 ppm of HBr and 10 ppm of $Br_2$, and a gas (97.5 vol.% of $N_2$ and 2.5 vol.% of $H_2O$) containing 20 ppm of HI and 10 ppm of $I_2$ were passed through the individual columns at a linear flow rate of 40 cm/sec at 250° C., respectively, to determine the lengths of time until HCl—$Cl_2$ (converted to the total Cl), HBr—$Br_2$ (converted to the total Br) and HI—$I_2$ (converted to the total I) leaked respectively out of the columns (i.e., the lengths of time required until the respective removal ratios reached 95%). The results are shown in Table 3.

TABLE 3

| Adsorbent No. | | The length of time for which the removal percentages for HCl, Cl₂ reached 95% (hrs.) | The length of time for which the removal percentages for HBr, Br₂ reached 95% (hrs.) | The length of time for which the removal percentages for HI, I₂ reached 95% (hrs.) |
|---|---|---|---|---|
| A₀ | (Control) | 2 | 3 | 5 |
| A₁ | (Control) | 14 | 18 | 29 |
| A₃ | (Control) | 12 | 13 | 14 |
| A₁₂ | (Control) | 15 | 20 | 28 |
| B₂ | (The present invention) | 42 | 55 | 68 |
| C₄ | (The present invention) | 47 | 50 | 55 |
| C₉ | (The present invention) | 46 | 53 | 61 |
| D₃ | (The present invention) | 70 | 78 | 80 |
| D₈ | (The present invention) | 65 | 85 | 78 |
| D₁₃ | (The present invention) | 43 | 51 | 58 |
| D₁₅ | (The present invention) | 103 | 109 | 110 |
| E₂ | (The present invention) | 40 | 55 | 65 |
| E₄ | (The present invention) | 68 | 88 | 90 |
| F₆ | (The present invention) | 51 | 62 | 75 |
| G₁ | (The present invention) | 42 | 59 | 78 |
| G₃ | (The present invention) | 72 | 90 | 92 |
| G₁₀ | (The present invention) | 70 | 90 | 95 |

What is claimed is:

1. A method for the removal of halogens and/or hydrogen halides from a gas containing the same, which comprises contacting the gas with an adsorbent comprising an activated carbon having as supported thereon (1) one or two components included in Group I below and (2) one or more components included in Group II below:

| Group | Component |
|---|---|
| I | copper oxide and zinc oxide |
| II | (a) alkali metal oxides |
| | (b) alkaline earth metal oxides |
| | (c) oxides of Al, Ti, V, Cr, Mn, Fe, Co, Ni, Cd and Pb |

2. A method as claimed in claim 1, wherein the one or two components included in Group I are copper oxide.

3. A method as claimed in claim 1, wherein the one or two components included in Group I are zinc oxide.

4. A method as claimed in claim 1, wherein the one or two components included in Group I are copper oxide and zinc oxide.

5. A method as claimed in claim 1, wherein the activated carbon is one having as supported thereon copper oxide, zinc oxide and potassium oxide.

6. A method as claimed in claim 1, wherein the activated carbon is one having as supported thereon copper oxide, calcium oxide and potassium oxide.

7. A method as claimed in claim 1, wherein the activated carbon is one having as supported thereon zinc oxide, calcium oxide and potassium oxide.

8. A method as claimed in claim 1, wherein the gas is contacted with the adsorbent at a temperature not higher than 600° C.

9. A method as claimed in claim 1, wherein the gas is contacted with the adsorbent at a temperature ranging from 0° C. to 300° C.

10. A method as claimed in claim 1, wherein each of the components is supported on the activated carbon so that the amount of the copper oxide included in Group I, when used, is in the range of from 0.1 to 3.0 mg-atom as metal per g of activated carbon, the amount of the zinc oxide included in Group I, when used, is in the range of from 0.1 to 3.0 mg-atom as metal per g of activated carbon, and the total amount of the components included in Group II is in the range of from 0.1 to 5.0 mg-atom as metal per g of activated carbon.

* * * * *